(12) United States Patent
Gagnon et al.

(10) Patent No.: US 10,778,019 B2
(45) Date of Patent: Sep. 15, 2020

(54) REVERSE CURRENT PREVENTION FOR FET USED AS REVERSE POLARITY PROTECTION DEVICE

(71) Applicant: Connaught Electronics Ltd., Tuam, County Galway (IE)

(72) Inventors: Noah Gagnon, Troy, MI (US);
Guillaume Hamard, Troy, MI (US);
Bernd Rabich, Troy, MI (US);
Dominik Lebherz, Troy, MI (US)

(73) Assignee: Connaught Electronics Ltd., Tuam, County Galway (IE)

( * ) Notice: Subject to any disclaimer, the term of this patent is extended or adjusted under 35 U.S.C. 154(b) by 407 days.

(21) Appl. No.: 15/655,111

(22) Filed: Jul. 20, 2017

(65) Prior Publication Data

US 2019/0027945 A1 Jan. 24, 2019

(51) Int. Cl.
*H02J 7/00* (2006.01)
*H02H 3/18* (2006.01)
*H02H 7/18* (2006.01)
*H02H 11/00* (2006.01)

(52) U.S. Cl.
CPC ............ *H02J 7/0034* (2013.01); *H02H 3/18* (2013.01); *H02H 7/18* (2013.01); *H02H 11/003* (2013.01)

(58) Field of Classification Search
CPC .... H02H 11/002; H02H 11/003; H02H 3/003; H02H 3/081; H02H 3/18; H02H 3/382; H02H 3/42; H02H 7/18; H02H 7/265; H02H 9/047; H02J 7/0034; H03K 17/063
See application file for complete search history.

(56) References Cited

U.S. PATENT DOCUMENTS

| 7,800,433 | B2* | 9/2010 | Yoshikawa | .... H03K 19/017545 |
| | | | | 327/530 |
| 9,162,639 | B2* | 10/2015 | Kanzaki | ............... H02H 11/003 |
| 2003/0081365 | A1* | 5/2003 | He | ........................ H02H 11/003 |
| | | | | 361/82 |
| 2007/0268048 | A1* | 11/2007 | Komatsu | .............. H02H 11/003 |
| | | | | 327/143 |
| 2008/0048618 | A1* | 2/2008 | Melanson | ............. H02J 7/0031 |
| | | | | 320/134 |
| 2013/0229738 | A1* | 9/2013 | Gueltig | ................ H02H 11/003 |
| | | | | 361/56 |
| 2014/0239713 | A1* | 8/2014 | Kanzaki | .................... H02J 1/00 |
| | | | | 307/11 |
| 2017/0047731 | A1* | 2/2017 | Manohar | .................. H03K 5/08 |

* cited by examiner

*Primary Examiner* — Jared Fureman
*Assistant Examiner* — Nicolas Bellido
(74) *Attorney, Agent, or Firm* — Osha Liang LLP (57) ABSTRACT

A battery reverse polarity protection circuit is disclosed. The battery reverse polarity protection circuit includes a field effect transistor (FET) coupled to a control circuit. The FET is configured to transmit an input voltage from a normal-polarity-connected battery to an output terminal, and block the input voltage from a reverses polarity-connected battery to the output terminal. The control circuit is coupled to the input terminal, the output terminal, and a common terminal and is configured to detect, during transmission of the input voltage from the normal-polarity-connected battery to the output terminal, that the input voltage is less than an output voltage, indicating onset of an abnormal operating mode, and turn off the FET to prevent the output voltage from being affected by the input voltage during the abnormal operating mode.

19 Claims, 7 Drawing Sheets

REVERSE CURRENT PREVENTION FOR FET USED AS REVERSE POLARITY PROTECTION DEVICE

BACKGROUND

Reverse polarity protection is to protect a direct current (DC) powered device or equipment from potential damage when a battery has been installed backwards, or when the leads (wires) from a DC power source have been reversed.

SUMMARY

In general, in one aspect, the invention relates to a battery reverse polarity protection circuit. The battery reverse polarity protection circuit includes (i) an input terminal configured to receive an input voltage, (ii) an output terminal configured to provide an output voltage to a load device, (iii) a common terminal for referencing the input voltage and the output voltage, (iv) a field effect transistor (FET) having an FET drain terminal coupled to the input terminal, an FET source terminal coupled to the output terminal, and an FBI gate terminal coupled to a control circuit, where the FET is configured to transmit the input voltage from a normal-polarity-connected battery to the output terminal, and block the input voltage from a reverse-polarity-connected battery to the output terminal, and (v) the control circuit coupled to the input terminal, the output terminal, and the common terminal and configured to detect, during transmission of the input voltage from the normal-polarity-connected battery to the output terminal, that the input voltage is less than the output voltage, indicating onset of an abnormal operating mode, and turn off the FET to prevent the output voltage from being affected by the input voltage during the abnormal operating mode.

In general, in one aspect, the invention relates to a battery reverse polarity protection circuit that supplies battery voltage to a load device when the battery is connected with correct polarity, thereby avoiding a reverse current. The battery reverse polarity protection circuit includes (i) an input terminal configured to receive an input voltage, (ii) an output terminal configured to provide an output voltage to a load device, (iii) a common terminal for referencing the input voltage and the output voltage, (iv) a metal-oxide-semiconductor field effect transistor (FET) having a FET drain terminal coupled to the input terminal, a FET source terminal coupled to the output terminal, and a FET gate terminal coupled to a control circuit, where the FET is configured to transmit the input voltage from a normal-polarity-connected battery to the output terminal, and block the input voltage from a reverse-polarity-connected battery to the output terminal, and (v) the control circuit coupled to the input terminal, the output terminal, and the common terminal and configured to detect, during transmission of the input voltage from the normal-polarity-connected battery to the output terminal, that a decreasing rate of the input voltage exceeds a pre-determined threshold, indicating onset of an abnormal operating mode, and turn off the FET to prevent the output voltage being affected by the input voltage during the abnormal operating mode.

In general, in one aspect, the invention relates to a method for battery reverse polarity protection. The method includes (i) receiving, at an input terminal of a battery reverse polarity protection circuit, an input voltage from a normal-polarity-connected battery, (ii) transmitting, using a field effect transistor (FET), the input voltage from the normal-polarity-connected battery to an output terminal of the battery reverse polarity protection circuit, where the FET has an FET drain terminal coupled to the input terminal, an FET source terminal coupled to the output terminal, and an FET gate terminal coupled to a control circuit, (iii) detecting, using a control circuit while the FBI transmits the input voltage from the normal-polarity-connected battery to the output terminal, that the input voltage drops below the output voltage, indicating onset of an abnormal operating mode, and (iv) turning off the FET to prevent the output voltage from being affected by the input voltage during the abnormal operating mode.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which ma be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a battery reverse polarity protection circuit that supplies battery voltage to a load device when the battery is connected with correct polarity, thereby avoiding a reverse current. The battery reverse polarity protection circuit is configured to detect an abnormal condition (e.g., a short circuit condition or a pull-down due to loads on the input) of the battery voltage and, in response, isolate the load device from the battery to prevent potential reset or other damage to the load device. In one or more embodiments of the invention, the battery reverse polarity protection circuit includes an input terminal to receive an input voltage, an output terminal to provide an output voltage to the load device, a common terminal for referencing the input voltage and output voltage, a field effect transistor (FET), and a control circuit coupled to the input terminal, the output terminal, and the common terminal. The FET transmits the input voltage to the output terminal when the battery is connected with normal polarity, and blocks the input voltage to the output terminal when the battery is connected with reverse polarity. During transmission of the input voltage from the normal-polarity-connected battery to the output terminal, the control circuit may detect that the input voltage is less than the output voltage, indicating onset of an abnormal operating mode. In response, the control circuit turns off the FET to prevent the output voltage from being affected by the input voltage during the abnormal operating mode. In one or more embodiments of the invention, the FET is a p-channel metal-oxide-semiconductor (p-channel MOS or PMOS) device. In other words, the FET is a p-channel MOSFET.

Reverse current protection avoids discharge of the capacitor through the PMOS and then through the power input terminals. Embodiments of the invention allow for a product such as a radar or camera to operate properly even when there is a short (e.g., milliseconds) interruption of power supplied by the power supply, and allows an amount of time to shutdown the ECU properly (e.g., by first saving parameters in memory, avoiding memory integrity compromise and sporadic change in outputs). Such short interruptions in power are due generally to a bad contact in connectors/harnesses or in a switch, or may be due to contact in electro-mechanical relay.

Figure 1:
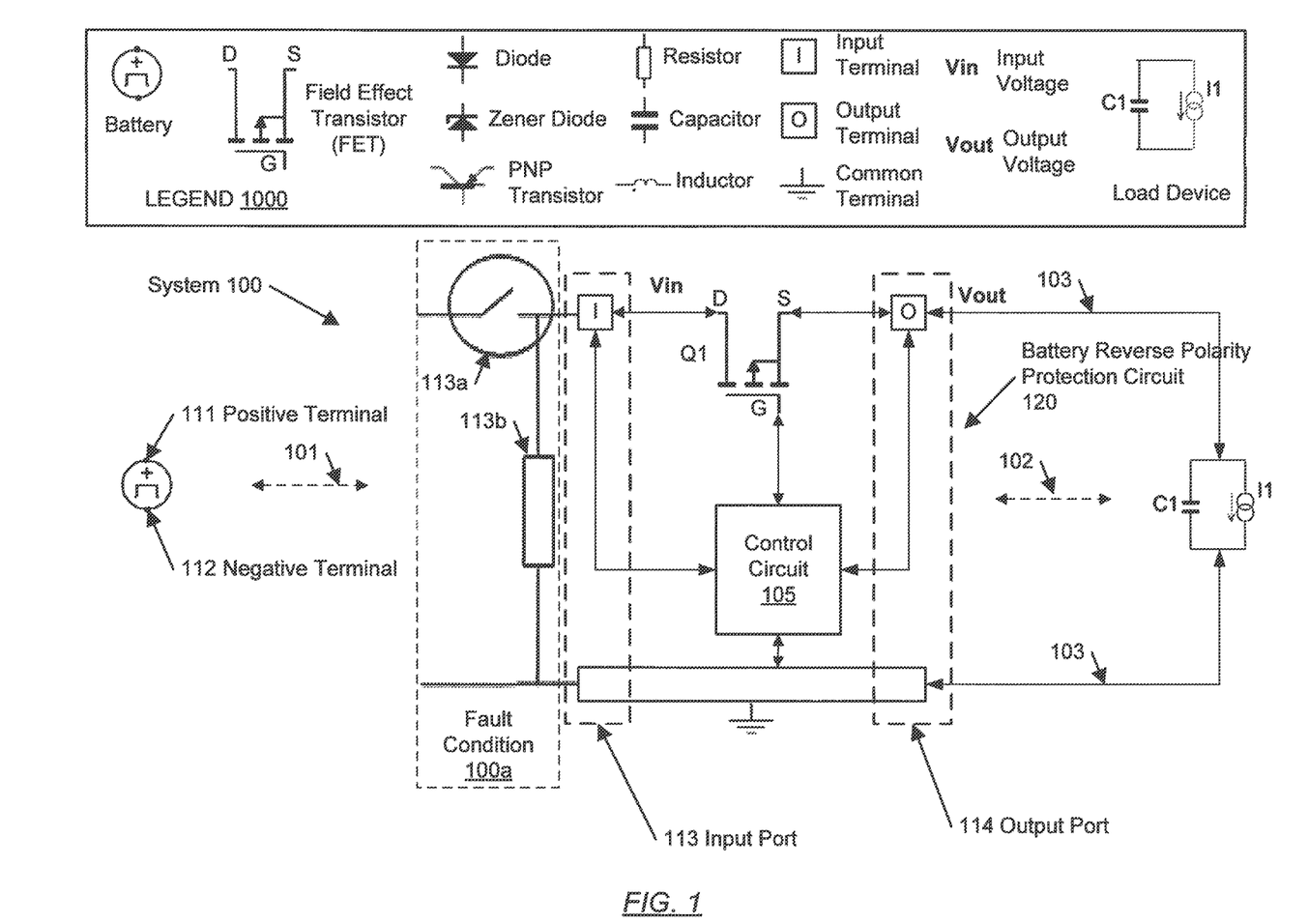
FIG. 1 show a system diagram in accordance with one or more embodiments of the invention.

FIG. 1 shows a system (100) in accordance with one or more embodiments of the invention. In particular, the system (100) is depicted according to the legend (1000), which is also applicable to FIGS. 2, 3, 4, 5, 6, 7, 8, and 9 below. In one or more embodiments of the invention, one or more of the elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a battery reverse polarity protection circuit (105) coupled to a battery and a load device. In particular, he solid arrows connecting the elements of the system (100) represent electrical connections, including both direct connections and indirect connections via intervening circuit components. In one or more embodiments, the load device is an electrical circuit or device that operates using an DC output voltage supplied from the battery via the battery reverse polarity protection circuit (105). Abnormal conditions of the DC output voltage received by the load device may disrupt the operation of the load device and/or damage the load device. Abnormal conditions may include excessive low voltage level, high rate of voltage swing, incorrect voltage polarity, etc. As a result, reset condition, data corruption, component damage, etc. of the load device may occur.

In one or more embodiments, the battery reverse polarity protection circuit (105) includes an input port (113), an output port (114), an FET (e.g., PMOS) denoted as Q1, and a control circuit (105). The input port (113) includes an input terminal and a common terminal depicted based on the legend (1000). The input voltage is the voltage received by the battery reverse polarity protection circuit (105) from the battery at the input terminal as referenced to the common terminal. The output port (114) includes an output terminal and the common terminal depicted based on the legend (1000). The Output voltage is the voltage provided by the battery reverse polarity protection circuit (105) to the load device at the output terminal as referenced to the common terminal. For example, the input port (113) may correspond to a battery receptacle, a battery socket, battery harness, battery connector, or other means for battery connection. Further, the output port (114) may correspond to an output receptacle, output socket, output harness, output connector, or other means for load device connection. In one or more embodiments, the load device is designed to operate using a positive DC output voltage. In such embodiments, the input terminal corresponds to a positive terminal of the battery receptacle, battery socket, battery harness, battery connector, etc. The output terminal corresponds to a positive terminal of the output receptacle, output socket, output harness, output connector, etc. Further, the common terminal connects the negative terminal of the battery receptacle, battery socket, battery harness, battery connector, etc. and the negative terminal of the output receptacle, output socket, output harness, output connector, etc.

In one or more embodiments, the battery is removably coupled to the input port (113). In particular, the dashed arrow (101) represents user-removable electrical connections that may be connected and/or disconnected by a user. For example, the battery may be inserted into or otherwise connected with the battery receptacle, battery socket, battery harness, battery connector, etc. by the user. In one or more embodiments, the battery includes a positive terminal (111) and a negative terminal (112), where the positive terminal (111) has a more positive voltage than the negative terminal (112). In those embodiments where the load device is designed to operate using a positive DC output voltage, the positive terminal (111) is designed to be connected, e.g. by the user, to the input terminal of the battery reverse polarity protection circuit (105). In addition, the negative terminal (112) is designed to be connected, e.g., by the user, to the common terminal of the battery reverse polarity protection circuit (105). A normal-polarity-connected battery is the battery that is inserted into or connected with the input port (113) correctly, i.e., according to the designed polarity. In other words, the normal-polarity-connected battery has the positive terminal (111) connected with the input terminal and the negative terminal (112) connected with the common terminal. Accordingly, the input voltage received at the input terminal is from the positive terminal (111). In contrast, a reverse-polarity-connected battery is the battery that is inserted into or connected with the input port (113) incorrectly, i.e., opposite to the designed polarity. In other words, the reverse-polarity-connected battery has the positive terminal (111) incorrectly connected with the common terminal and the negative terminal (112) incorrectly connected with the input terminal. Accordingly, the input voltage incorrectly received at the input terminal is from the negative terminal (112).

In one or more embodiments, the control circuit (105) is configured to open the FET (e.g., PMOS) Q1 when the input voltage, Vin, becomes lower than the output voltage, Vout due to a fault condition (100a). In particular, the control circuit (105) opening the PMOS Q1 prevents discharging the load device capacitance C1 when the fault condition (100a) occurs. As an example, the element (113b) may correspond to a short circuit causing the fault condition (100a) where the input voltage, Vin, is connected to the common terminal directly. In another example, the element (113a) may correspond to a bad or intermittent contact causing the fault condition (100a) where the input voltage, Vin, is pulled down to the common terminal by an external load represented by the element (113b) on the input voltage, Vin. In general, the energy stored in capacitor C1 is dedicated to supply load current, I1, of the load device during power shut down (including short power interruption) through a time period depending on the values of I1 and C1.

In one or more embodiments, the FET PMOS) Q1 includes an FET drain terminal coupled to the input terminal, an FET source terminal coupled to the output terminal, and an FET gate terminal coupled to the control circuit (105). In one or more embodiments, the FET (e.g., PMOS) Q1 is configured to transmit the input voltage from a normal-polarity-connected battery to the output terminal, and block the input voltage from a reverse-polarity-connected battery to the output terminal. In one or more embodiments, the FET Q1 is or otherwise includes a P-channel FET In one or more embodiments, the control circuit (105) is coupled to the input terminal, the output terminal, and the common terminal. In one or more embodiments, the control circuit (105) is configured to detect, during transmission of the input voltage from the normal-polarity-connected battery to the output terminal, onset of an abnormal operating mode. In response, the control circuit (105) is configured to turn off the FET (e.g., PMOS) to prevent the output voltage from being affected by the input voltage during the abnormal operating mode. In one or more embodiments, the control circuit (105) detects the onset of the abnormal operating mode as indicated by the input voltage being less than the output voltage. Examples of such embodiments are described in reference to FIGS. 2, 3, 4, 5, 6, 7, and 8 below. In one or more embodiments, the control circuit (105) detects the onset of the abnormal operating mode as indicated by a decreasing rate of the input voltage exceeding a pre-determined threshold. An example of such embodiments is described in reference to FIG. 9 below.

FIGS. 2, 3, 4, 5, 6, 7, and 8 show various examples of the system (100), depicted in FIG. 1 above, in accordance with one or more embodiments of the invention. In particular, the various examples are depicted according to the legend (1000) and correspond to the embodiments where the control circuit detects the onset of the abnormal operating mode as indicated by the input voltage being less than the output voltage. In one or more embodiments of the invention, one or more of the elements shown in FIGS. 2, 3, 4, 5, 6, 7, and 8 may be omitted, repeated, and/or substituted. Accordingly, embodiments of the invention should not be considered limited to the specific arrangements of modules shown in FIGS. 2, 3, 4, 5, 6, 7, and 8.

Figure 2:
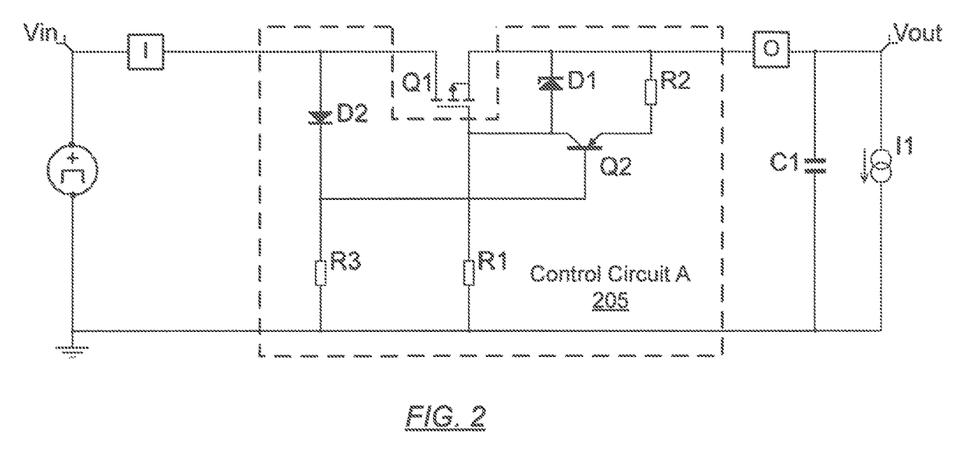
FIGS. 2, 3, 4, 5, 6, 7, 8, and 9 show circuit diagrams in accordance with one or more embodiments of the invention.

As shown in FIG. 2, the control circuit A (205) is an example of the control circuit (105) depicted in FIG. 1 above. In particular, the control circuit A (205) includes a bipolar transistor Q2 having a collector terminal coupled to the FET gate terminal, an emitter terminal coupled to the FET source terminal via a resistor R2, and a base terminal connected to a trigger circuit. In particular, the trigger circuit is the circuit controlling the voltage at the base terminal of the bipolar transistor in the control circuit. Specifically, the trigger circuit controls the voltage that causes the bipolar transistor to turn on. In the control circuit A (205), the trigger circuit includes a diode D2 and a resistor R3 connected in series. The anode and cathode of the diode D2 are coupled to the input terminal and the base terminal, respectively. Accordingly, the diode D2 and the emitter-base junction of the bipolar transistor Q2 form a voltage comparator circuit that compares the input voltage and the output voltage. More particularly, the diode D2 and the emitter-base junction of the bipolar transistor Q2 act as two mirrored input paths of the voltage comparator circuit. The trigger circuit in this configuration turns on the bipolar transistor Q2 in response to the input voltage becoming less than the output voltage. Before the bipolar transistor Q2 is turned on, the FET gate terminal of Q1 is approximately 0 volt while the FET source terminal of Q1 is near $V_{out}$. Such gate-to-source voltage magnitude causes the FET (e.g., PMOS) Q1 to conduct with low resistance. As a result of turning on the bipolar transistor Q2, the gate-to-source voltage magnitude of the FET (e.g., PMOS) Q1 is reduced to turn off the FET (e.g., PMOS) Q1.

Figure 3:
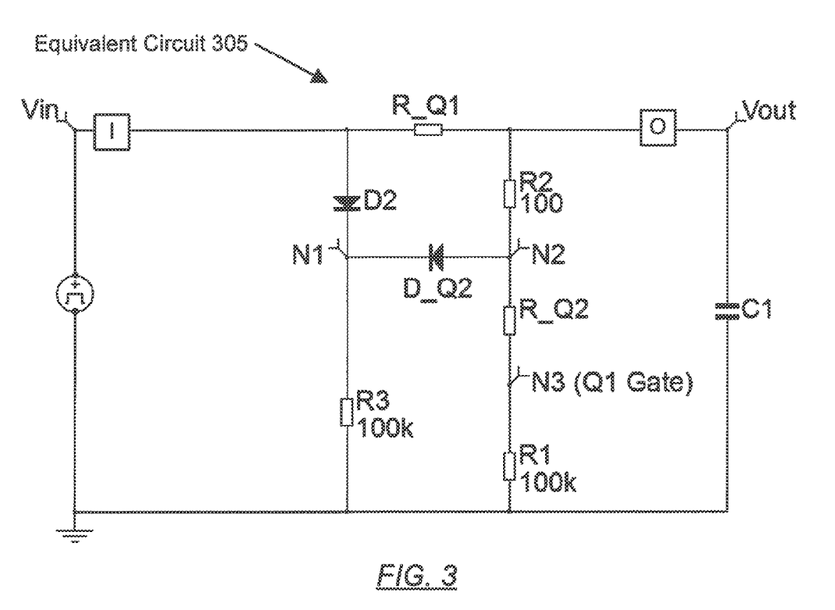

FIG. 3 shows an equivalent circuit (305) to illustrate further how the bipolar transistor Q2 is activated (i.e., turned on to conduct electrical current). In the description below, each component is referred to using the component symbol. In the equivalent circuit (305), D_Q2 represents the base-emitter junction of Q2, R_Q2 represents the emitter-collector resistance of Q2, and R_Q1 represents the drain-source resistance of Q1. In the initial DC condition of normal operation, $V_{in}$ is a positive voltage, such as 12V. R_Q1 is small since Q1 is fully "on", therefore the drain-to-source voltage drop Von is small (e.g., less than 20 mV depending on the load device). Accordingly, $V_{out}$ is nearly equal to (e.g., 20 mV lower than) $V_{in}$. The voltage at N1 will be higher than N2 due to the presence of R2, if R_Q2 decreases enough to activate Q1, then there would be a voltage divider of R1 and R2, causing N2 to drop.

As $V_{in}$ drops in an abnormal operating mode (e.g., a short circuit condition at the input terminal), the voltage at N1 drops faster than N2 because the voltage at N2 cannot respond instantly due to C1, R_Q1, and R2. This allows current to flow through P_Q2, thus activating Q2 to conduct. As Q2 conducts (i.e., R_Q2 decreases) the voltage at N3 rises to cause Q1 to conduct less (i.e., R_Q1 increases). As R_Q1 increases, N2 decreases less, which increases the current through D_Q2 and causes Q2 to conduct more. This cycle is self-reinforcing and turns off Q1 completely, blocking the reverse current path from the output terminal to the input terminal. In other words, turning off Q1 prevents the output voltage being affected by the input voltage during the abnormal operating mode.

Figure 4:
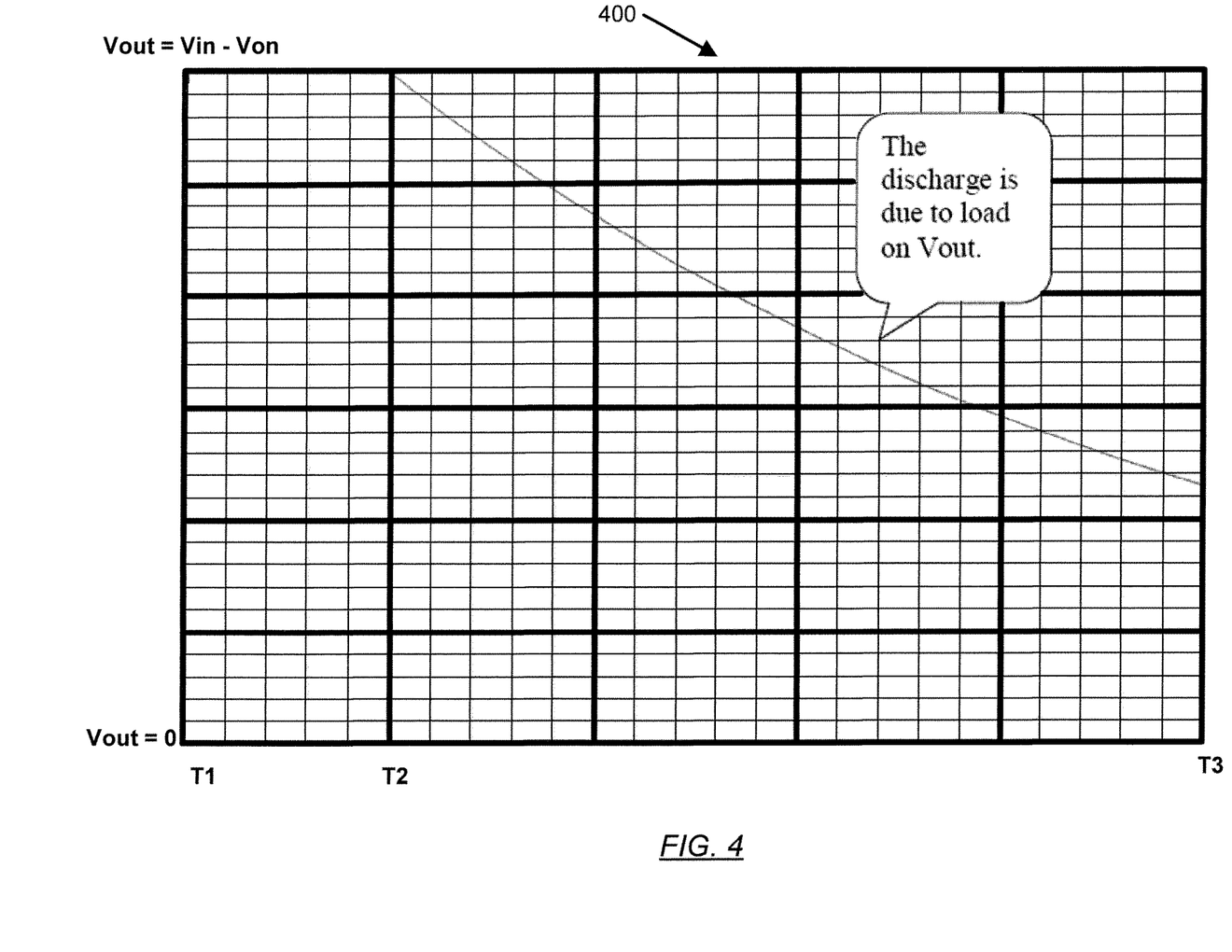

FIG. 4 shows a diagram (400) illustrating isolating the output voltage from the input voltage by turning off the VET (e.g., PMOS) Q1. As shown in FIG. 4, the horizontal axis corresponds to time and the vertical axis corresponds to the output voltage. From time T1 through T2, the FET (e.g. PMOS) Q1 transmits the input voltage from the battery to output terminal. Accordingly, the output voltage stays constant over time. Specifically, $V_{out}$ equals $V_{in}$ minus the drain-to-source voltage drop Von. At time 12, the control circuit detects the onset of an abnormal operating mode to turn off the FET (e.g., PMOS) Q1. Accordingly, the output voltage is isolated from the input voltage and starts to decrease (e.g. toward $V_{out}$=0) due to discharge through the load device from T2 through T3 and beyond. For example, the abnormal operating mode may be triggered by a short circuit condition causing the input voltage to rapidly decrease to 0. By isolating the output voltage from the input voltage, the output voltage decreases at a much slower rate than the input voltage so as to avoid the reset condition or data corruption of the load device.

Figure 5:
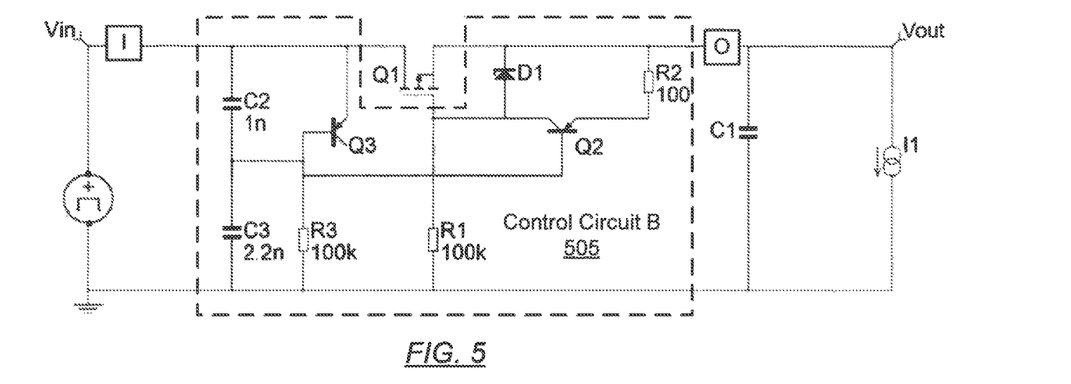

As shown in FIG. 5, the control circuit B (505) is a variation of the control circuit A (205) depicted in FIG. 2 above. In particular, the diode D2 depicted in the control circuit A (205) is substituted in the control circuit B (505) by an emitter-base junction of a bipolar transistor Q3 having a floating collector terminal. The substitution matches the emitter-base junction of Q3 to D_Q2 resulting a balanced circuit. In this example Q2 and Q3 are the SMBT3906DW1, which contains two PNP transistors in a single package. This helps to eliminate process variations and differences in junction temperature between Q2 and Q3, In addition, C3 is added to suppress a voltage spike that may appear at R3 when $V_{in}$ rises sharply. Further, C2 compensates for worst case gain variations in Q2 by providing a higher current path for D_Q2 during a sharp voltage decrease in $V_{in}$. For example, consider a worst-case situation where the Q2 gain drops from 100 to 10. If $V_{in}$ decreases from 12V to 0V (or less) rapidly (e.g., less than 1 micro-second) in a short circuit condition, $V_{out}$ may decrease with $V_{in}$ without C2 in the control circuit B (505).

Figure 6:
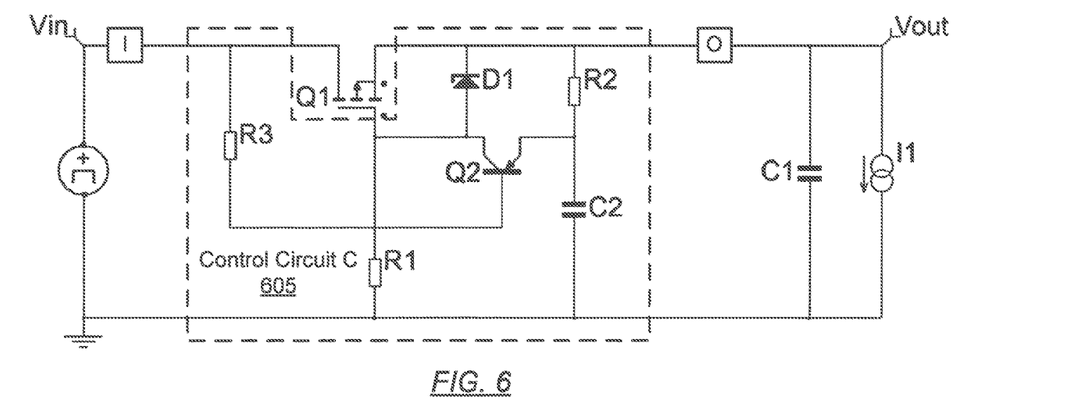

As shown in FIG. 6, the control circuit C (605) is another variation of the control circuit A (205) depicted in FIG. 2 above. In particular, the trigger circuit of serially connected diode D2 and resistor R3 is substituted by a resistor R3 coupling the FET drain terminal and the base terminal of the bipolar transistor Q2. This control circuit C (605) works well when $V_{in}$ decreases slowly, but may have a slightly slower response than the control circuit A (205) when $V_{in}$ decreases quickly.

Figure 7:
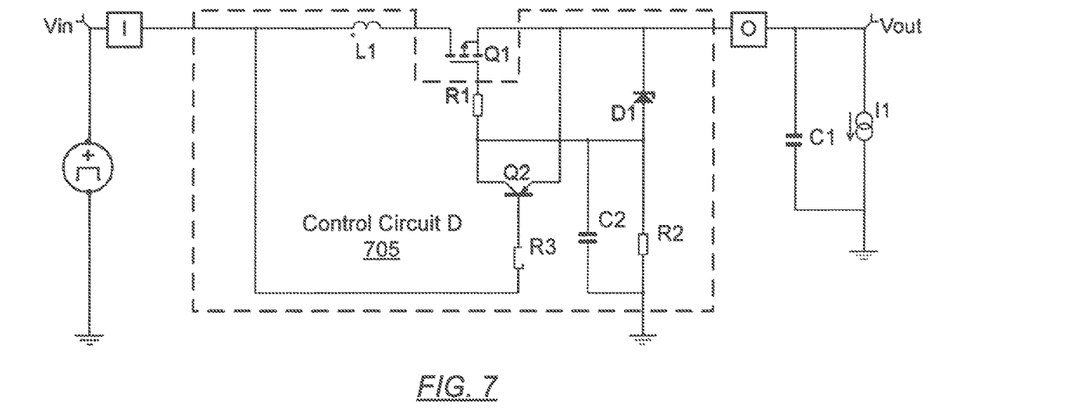

As shown in FIG. 7, the control circuit D (705) is a variation of the control circuit C (605) depicted in FIG. 6 above. In particular, an inductor L1 in inserted between the resistor R3 and the FET drain terminal. In other words, the input terminal and the resistor R3 are collectively coupled to the FET drain terminal via the inductor L1. The addition of L1 increases the response speed by amplifying the difference between $V_{in}$ and $V_{out}$ during the transient condition.

Figure 8:
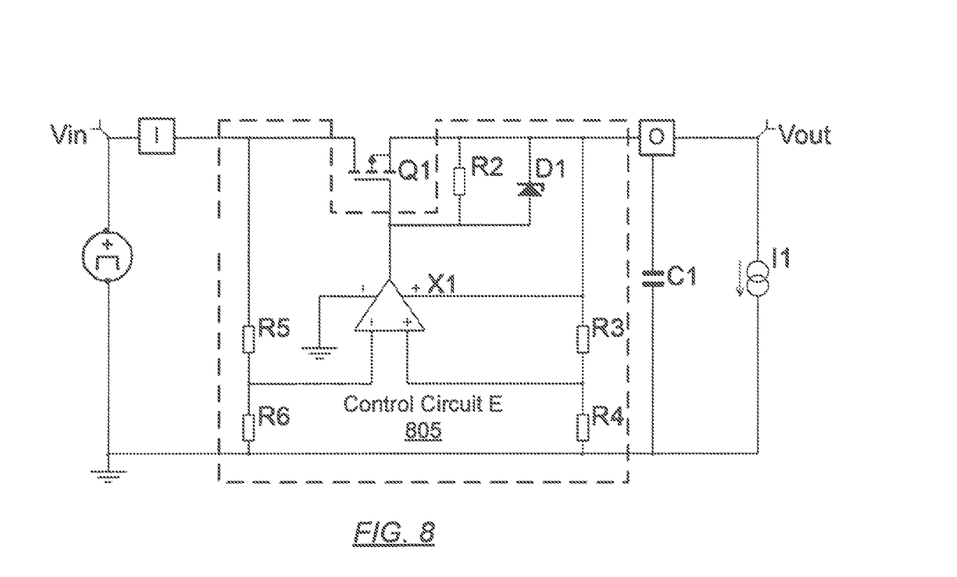

As shown in FIG. 8, the control circuit E (805) is yet another variation of the control circuit A (205) depicted in FIG. 2 above. In particular, the voltage comparator circuit formed by the diode D2 and the emitter-base junction of the bipolar transistor Q2 is substituted by a voltage comparator integrated circuit X1. The voltage comparator integrated circuit X1 compares $V_{in}$ and $V_{out}$ via two resistor divider networks and deactivates Q1 when $V_{in}$ decreases below $V_{out}$. The voltage comparator integrated circuit X1 may improves the response time of the control circuit E (805), but may have higher component cost than the control circuit A (205).

Figure 9:
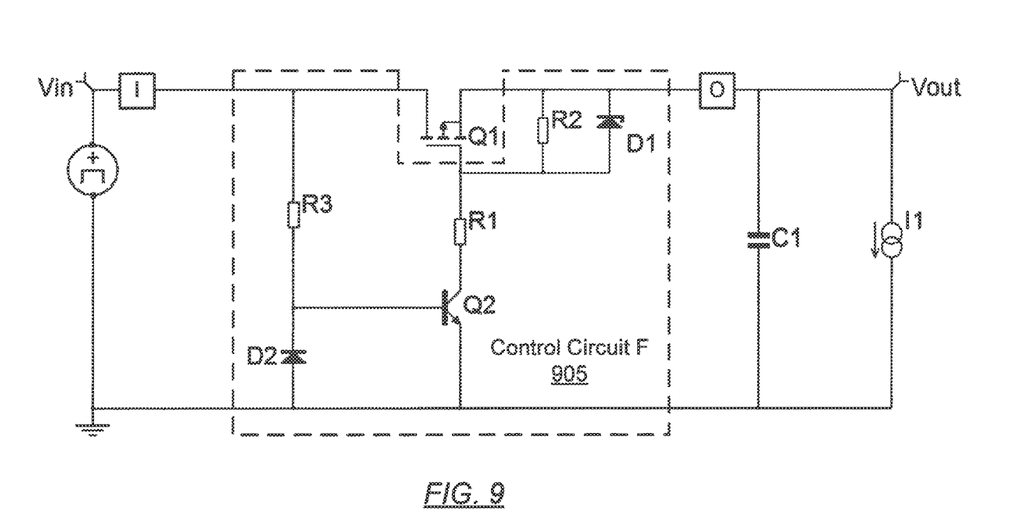

FIG. 9 shows an example of the system (100), depicted in FIG. 1 above, in accordance with one or more embodiments of the invention. In particular, the example is depicted according to the legend (1000) and corresponds to the embodiments where the control circuit detects the onset of the abnormal operating mode as indicated by a decreasing rate of the input voltage exceeding a pre-determined threshold. In one or more embodiments of the invention, one or more of the elements shown in FIG. 9 may be omitted, repeated, and/or substituted. Accordingly, embodiments of the invention should not be considered limited to the specific arrangements of modules shown in FIG. 9.

As shown in FIG. 9, the trigger circuit controlling the voltage at the base terminal of Q2 includes the resistor R3 and the diode D2. The resistance of R3 and transistor properties of Q2 are selected such that Q2 is turned off when $V_{in}$ quickly drops below a voltage threshold. This is distinct from the examples shown in FIGS. 2, 3, 4, 5, 6, 7, and 8 in that the trigger condition is not related to $V_{out}$, but depends on the choice of R3 and Q2. Before the bipolar transistor Q2 is turned off, the FET gate terminal of Q1 is near 0 volt while the FET source terminal of Q1 is near $V_{out}$. Such gate-to-source voltage magnitude causes the FET PMOS) Q1 to conduct with low resistance. As a result of turning off the bipolar transistor Q2, the gate-to-source voltage magnitude of the FET (e.g., PMOS) Q1 is reduced to turn off the FET (e.g., PMOS) Q1 to prevent $V_{out}$ from being driven by $V_{in}$ to decrease rapidly. However, if $V_{in}$ decreases slowly, the circuit may not trigger fast enough to fully isolate $V_{out}$ from $V_{in}$.

Figure 10:
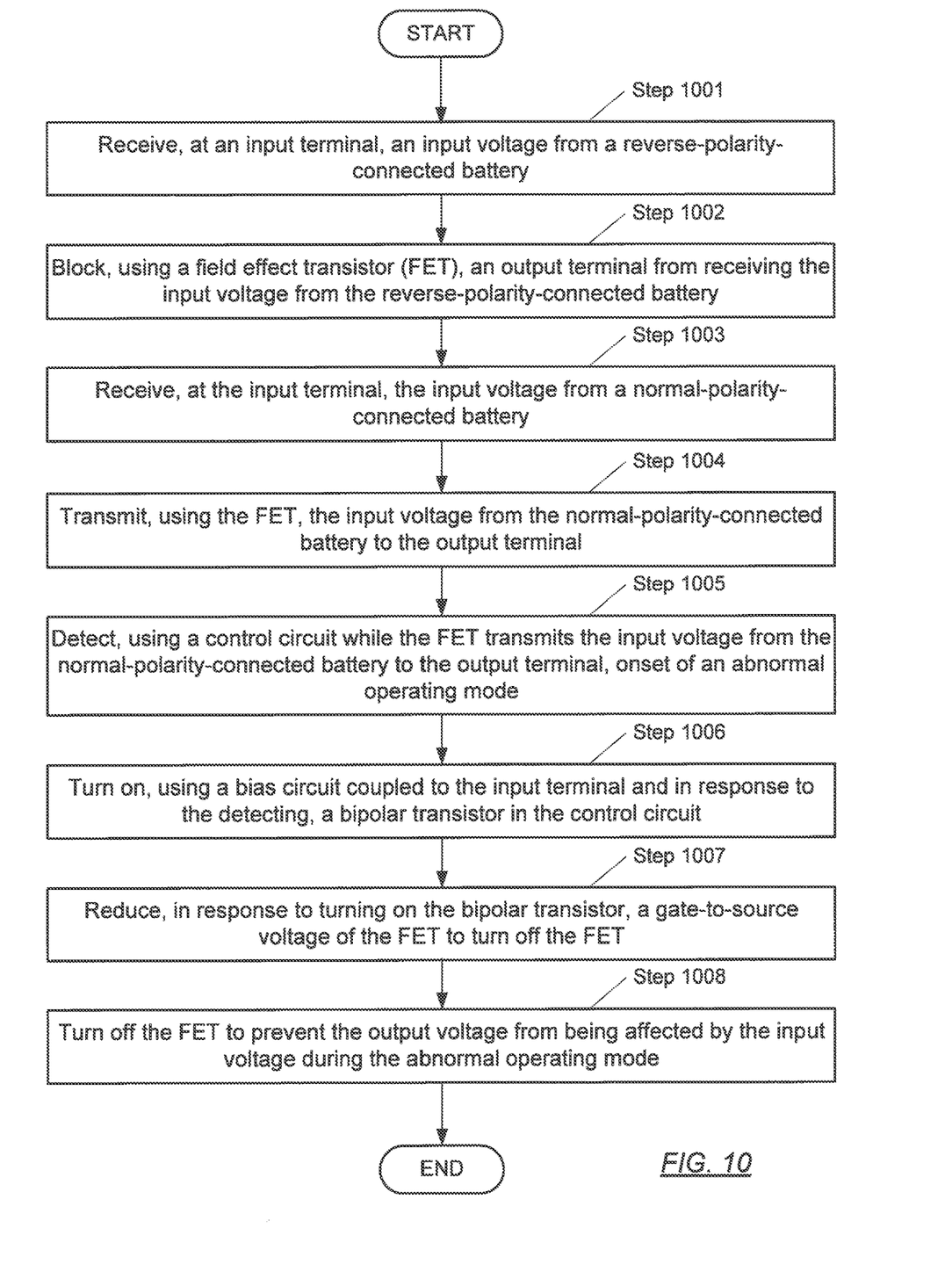
FIG. 10 shows a method flowchart in accordance with one or more embodiments of the invention.

FIG. 10 shows a method flowchart in accordance with one or more embodiments. In one or more embodiments, the method may be based on one or more control circuits described in FIGS. 1-9 above. One or more steps shown in FIG. 10 may be omitted, repeated, and/or performed in a different order among different embodiments of the invention. Accordingly, embodiments of the invention should not be considered limited to the specific number and arrangement of steps shown in FIG. 10.

Initially, in Step 1001, an incorrect input voltage is received at an input terminal of a reverse polarity protection circuit from a reverse-polarity-connected battery. The reverse-polarity-connected battery is incorrectly connected via the reverse polarity protection circuit to a load device. In one or more embodiments, the load device is designed to operate using a positive DC output voltage from an output terminal of the reverse polarity protection circuit. In other words, the load device is to indirectly receive power from the positive terminal of the battery. However, the negative terminal of the battery is incorrectly connected to the input terminal of the reverse polarity protection circuit.

In Step 1002, the output terminal of the reverse polarity protection circuit is blocked, using a field effect transistor (FET, e.g., PMOS) of the reverse polarity protection circuit, from receiving the incorrect input voltage from the reverse-polarity-corrected battery.

In Step 1003, a correct input voltage is received at the input terminal from a normal-polarity-connected battery. The normal-polarity-connected battery is correctly connected via the reverse polarity protection circuit to the load device. In the embodiments where the load device is designed to operate using a positive DC output voltage from the output terminal of the reverse polarity protection circuit, the positive terminal of the battery is correctly connected to the input terminal of the reverse polarity protection circuit.

In Step 1004, the correct input voltage is transmitted, using the FET (e.g., PMOS), from the normal-polarity-connected battery to the output terminal of the battery reverse polarity protection circuit to power the load device.

In Step 1005, using a control circuit while the FET (e.g., PMOS) transmits the correct input voltage from the normal-polarity-connected battery to the output terminal, an onset of an abnormal operating mode is detected. In one or more embodiments, detecting the onset of an abnormal operating mode is performed by detecting that the input voltage drops below the output voltage.

In Step 1006, in response to detecting, the onset of the abnormal operating mode, a bipolar transistor in the control circuit is turned on using a trigger circuit coupled to the input terminal and a based terminal of the bipolar transistor. In one or more embodiments, the trigger circuit includes a diode (e.g., a discrete diode component or an emitter-based junction of a discrete bipolar transistor component) that lowers the voltage at the base terminal when the input voltage drops below the output voltage in a short circuit condition.

In Step 1007, in response to turning on the bipolar transistor, a gate-to-source voltage magnitude of the FET (e.g., PMOS) is reduced to turn off the FET (e.g., PMOS). In one or more embodiments, the collector terminal of the bipolar transistor is connected to the FET gate terminal and the emitter terminal of the bipolar transistor is connected to the output terminal. Accordingly, turning on the bipolar transistor reduces the voltage difference between the collector terminal and emitter terminal so as to reduce the gate-to-source voltage magnitude of the FET (e.g., PMOS).

In Step 1008, the FET (e.g., PMOS) is turned off to prevent the output voltage from being affected by the input voltage during the abnormal operating mode. In other words, the output voltage is isolated from the input voltage so as to prevent being affected by the short circuit condition of the input voltage.

Figure 11:
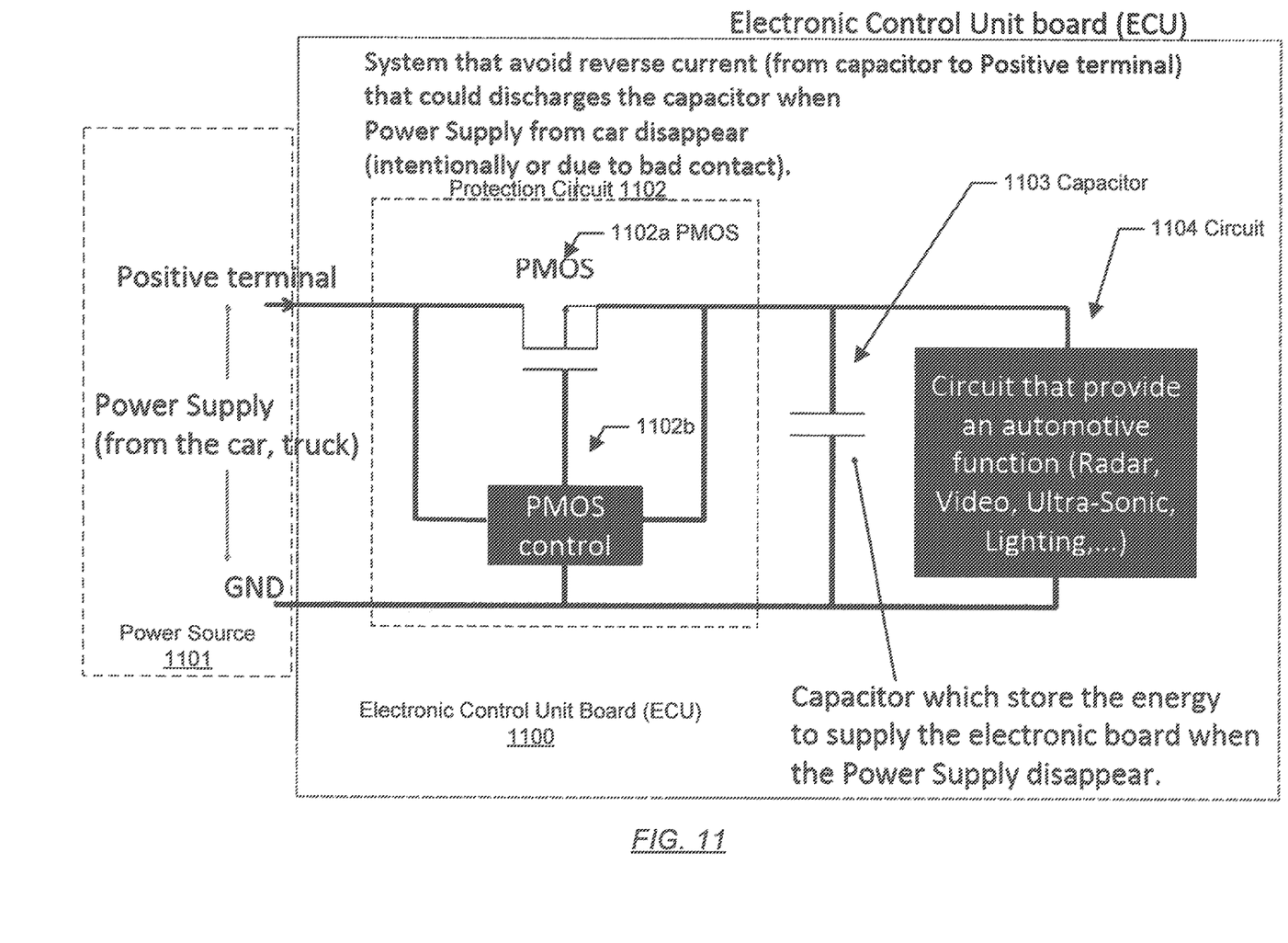
FIG. 11 shows an example in accordance with one or more embodiments of the invention.

FIG. 11 shows an example in accordance with one or more embodiments of the invention. In one or more embodiments of the invention, one or more of the elements shown in FIG. 11 may be omitted, repeated, and/or substituted. Accordingly, embodiments of the invention should not be considered limited to the specific arrangements of modules shown in FIG. 11.

As shown in FIG. 11, the example includes an electronic control unit board (ECU) (1100) that receives electrical power from a power source (1101). The ECU (1100) may be any automotive electronic product installed in a vehicle. The power source (1101) includes a vehicle power supply (e.g., a battery installed in a car, truck, etc.) that is connected to the ECU (1100) via a positive terminal and a ground (i.e., GND) terminal. The ECU (1100) includes a protection circuit (1102) that transmit the electrical power from the power source (1101) to a capacitor (1103) and circuit (11.04) connected in parallel. The circuit (1103) provides an automotive function (e.g., radar, video, ultra-sonic, lighting, etc.) of the automotive electronic product. In case of loss of power (e.g., due to intentional disconnection of the battery by a user or unintentional poor contact of the positive/GND terminal(s)), the protection circuit (1102) prevents a reverse current from the capacitor (1103) to the power source (1101). In particular, the protection circuit (1102) includes a PMOS (1102a) and PMOS control (1102b) that are examples of the FET and control circuit, respectively, described in reference to FIG. 1 above. In an example scenario of loss of power, the electrical energy stored in the capacitor (1103) allows the circuit (1104) to operate during a period of time, e.g., between 0.5 microseconds to 20 milliseconds, without power supplied by the power source (1101). This improves robustness in the automotive electronic product, e.g., by allowing the circuit (1104) to perform a proper shutdown process during the several milliseconds. In other words, when the voltage on input terminals drops below the capacitor (1103) (energy tank) voltage that the circuit (1104) avoids reverse current.

Those of ordinary skill in the art will appreciate that embodiments of the present invention may be used in any automotive application, such as radar, video board, camera systems, etc., independent of the product function. Embodiments of the invention provide the ability to avoid having a reverse current in case of a loss of power supply that guarantees that the electronic board runs during up to several milliseconds without power supply at the input. Advantageously, this provides robustness in the automotive electronics.

Embodiments of the invention may be advantageously applied to automotive electronic devices that employ a P-channel MOSFET in reverse battery protection. P-channel MOSFET based reverse battery protection circuit achieves low component count and lower power dissipation than a diode-based protection circuit, while avoiding the charge pump circuit used in a N-channel MOSFET based protection circuit. Embodiments of the invention advantageously prevent reverse current in the P-channel MOSFET based reverse battery protection circuit that causes the bulk capacitors to rapidly discharge back into the vehicle. Accordingly, embodiments advantageously prevent reset of a battery powered device due to an intermittent supply dropout, and provide sufficient time for the device software to detect rapid dropouts and perform shutdown routines.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A battery reverse polarity protection circuit, comprising:
   an input terminal configured to receive an input voltage;
   an output terminal configured to provide an output voltage to a load device;
   a common terminal for referencing the input voltage and the output voltage;
   a field effect transistor (FET) comprising:
      an FET drain terminal coupled to the input terminal;
      an FET source terminal coupled to the output terminal; and
      an FET gate terminal coupled to a control circuit,
      wherein the FET is configured to:
         transmit the input voltage from a normal-polarity-connected battery to the output terminal; and
         block the input voltage from a reverse-polarity-connected battery to the output terminal; and
   the control circuit coupled to the input terminal, the output terminal, and the common terminal and configured to:
      detect, during transmission of the input voltage from the normal-polarity-connected battery to the output terminal, that the input voltage is less than the output voltage, indicating onset of an abnormal operating mode; and
      turn off the FET to prevent the output voltage from being affected by the input voltage during the abnormal operating mode,
   wherein the control circuit comprises a first bipolar transistor having a base terminal connected to a trigger circuit,
   wherein the trigger circuit comprises a diode coupled to the input terminal and the base terminal of the first bipolar transistor, and
   wherein the diode and a first emitter-base junction of the first bipolar transistor form two mirrored input paths of a voltage comparator circuit.

2. The battery reverse polarity protection circuit of claim 1,
   wherein the normal-polarity-connected battery corresponds to a first battery having a first positive voltage terminal connected to the input terminal and a first negative voltage terminal connected to the common terminal, wherein the reverse-polarity-connected battery corresponds to a second battery having a second negative voltage terminal connected to the input terminal and a second positive voltage terminal connected to the common terminal, and wherein the FET comprises a P-channel FET.

3. The battery reverse polarity protection circuit of claim 1, wherein:

the first bipolar transistor further comprises a collector terminal coupled to the FET gate terminal, and an emitter terminal coupled to the FET source terminal, wherein the trigger circuit is coupled to the input terminal and configured to turn on the first bipolar transistor in response to the input voltage becoming less than the output voltage, and wherein turning on the first bipolar transistor reduces a gate-to-source voltage magnitude of the FET to turn off the FET.

4. The battery reverse polarity protection circuit of claim 1, wherein the diode comprises a second emitter-base junction of a second bipolar transistor having a floating collector terminal.

5. The battery reverse polarity protection circuit of claim 3, wherein the trigger circuit comprises a resistor coupling the FET drain terminal and the base terminal of the first bipolar transistor.

6. The battery reverse polarity protection circuit of claim 5, wherein the input terminal and the resistor are collectively coupled to the FET drain terminal via an inductor.

7. The battery reverse polarity protection circuit of claim 1, wherein the control circuit comprises a voltage comparator integrated circuit.

8. The battery reverse polarity protection circuit of claim 1, wherein the abnormal operating mode is caused by a short circuit condition between the input terminal and the common terminal.

9. A battery reverse polarity protection circuit, comprising:

an input terminal configured to receive an input voltage;
an output terminal configured to provide an output voltage to a load device;
a common terminal for referencing the input voltage and the output voltage;
a metal-oxide-semiconductor field effect transistor (FET) comprising:
a FET drain terminal coupled to the input terminal;
a FET source terminal coupled to the output terminal; and
a FET gate terminal coupled to a control circuit,
wherein the FET is configured to:
transmit the input voltage from a normal-polarity-connected battery to the output terminal; and
block the input voltage from a reverse-polarity-connected battery to the output terminal; and
the control circuit coupled to the input terminal, the output terminal, and the common terminal and configured to:
detect, during transmission of the input voltage from the normal-polarity-connected battery to the output terminal, that a decreasing rate of the input voltage exceeds a pre-determined threshold, indicating onset of an abnormal operating mode; and
turn off the FET to prevent the output voltage being affected by the input voltage during the abnormal operating mode, wherein the control circuit comprises a first bipolar transistor having a base terminal connected to a trigger circuit, wherein the trigger circuit comprises a diode coupled to the input terminal and the base terminal of the first bipolar transistor, and wherein the diode and a first emitter-base junction of the first bipolar transistor form two mirrored input paths of a voltage comparator circuit.

10. The battery reverse polarity protection circuit of claim 9, wherein the normal-polarity-connected battery corresponds to a first battery having a first positive voltage terminal connected to the input terminal and a first negative voltage terminal connected to the common terminal, wherein the reverse-polarity-connected battery corresponds to a second battery having a second negative voltage terminal connected to the input terminal and a second positive voltage terminal connected to the common terminal, and wherein the FET comprises a P-channel FET.

11. The battery reverse polarity protection circuit of claim 9, wherein the control circuit comprises:

a bipolar transistor having a collector terminal coupled to the FET gate terminal, an emitter terminal coupled to the common terminal, and a base terminal connected to a trigger circuit, wherein the trigger circuit is coupled to the input terminal and configured to turn off the first bipolar transistor in response to the decreasing rate of the input voltage exceeding the pre-determined threshold, and wherein turning off the first bipolar transistor reduces a gate-to-source voltage magnitude of the FET to turn off the FET.

12. The battery reverse polarity protection circuit of claim 3, wherein the trigger circuit further comprises a resistor coupling the FET drain terminal and the base terminal of the first bipolar transistor.

13. The battery reverse polarity protection circuit of claim 9, wherein the abnormal operating mode is caused by a short circuit condition between the input terminal and the common terminal.

14. A method for battery reverse polarity protection, comprising:

receiving, at an input terminal of a battery reverse polarity protection circuit, an input voltage from a normal-polarity-connected battery;

transmitting, using a field effect transistor (FET), the input voltage from the normal-polarity-connected battery to an output terminal of the battery reverse polarity protection circuit, wherein the FET comprises:
an FET drain terminal coupled to the input terminal;
an FET source terminal coupled to the output terminal; and
an FET gate terminal coupled to a control circuit, detecting, using a control circuit while the FET transmits the input voltage from the normal-polarity-connected battery to the output terminal, that the input voltage drops below the output voltage, indicating onset of an abnormal operating mode; and turning off the FET to prevent the output voltage from being affected by the input voltage during the abnormal operating mode, wherein the control circuit comprises a first bipolar transistor having a base terminal connected to a trigger circuit, wherein the trigger circuit comprises a diode coupled to the input terminal and the base terminal of the first bipolar transistor, and wherein the diode and a first emitter-base junction of the first bipolar transistor form two mirrored input paths of a voltage comparator circuit.

15. The method of claim 14, further comprising:

receiving, at the input terminal, the input voltage from a reverse-polarity-connected battery; and blocking, using the FET, the output terminal from receiving the input voltage from the reverse-polarity-connected battery.

16. The method of claim 14, wherein the normal-polarity-connected battery corresponds to a first battery having a first positive voltage terminal connected to the input terminal and a first negative voltage terminal connected to a common terminal, wherein the reverse-polarity-connected battery corresponds to a second battery having a second negative voltage terminal connected to the input terminal and a second positive voltage terminal connected to the common terminal, and wherein the FET comprises a P-channel FET.

17. The method of claim 14, further comprising:

turning on, using a trigger circuit coupled to the input terminal and in response to the input voltage becoming less than the output voltage, a first bipolar transistor comprised in the control circuit; and reducing, in response to turning on the first bipolar transistor, a gate-to-source voltage magnitude of the FET to turn off the FET, wherein the first bipolar transistor comprises a collector terminal coupled to the FET gate terminal, an emitter terminal coupled to the FET source terminal, and a base terminal connected to a trigger circuit.

18. The method of claim 17, wherein the trigger circuit comprises a diode coupled to the input terminal and the base terminal of the first bipolar transistor, and wherein the diode and a first emitter-base junction of the first bipolar transistor form two mirrored input paths of a voltage comparator circuit.

19. The battery reverse polarity protection circuit of claim 18, wherein the diode comprises a second emitter-base junction of a second bipolar transistor having a floating collector terminal.

* * * * *